United States Patent
Doerr et al.

(10) Patent No.: US 9,328,665 B2
(45) Date of Patent: May 3, 2016

(54) GAS-TURBINE COMBUSTION CHAMBER WITH MIXING AIR ORIFICES AND CHUTES IN MODULAR DESIGN

(71) Applicant: Rolls-Royce Deutschland Ltd & Co KG, Blankenfelde-Mahlow (DE)

(72) Inventors: Thomas Doerr, Berlin (DE); Leif Rackwitz, Rangsdorf (DE); Stefan Penz, Werneuchen (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 353 days.

(21) Appl. No.: 13/947,797

(22) Filed: Jul. 22, 2013

(65) Prior Publication Data
US 2014/0033723 A1  Feb. 6, 2014

(30) Foreign Application Priority Data

Aug. 3, 2012  (DE) .......................... 10 2012 015 449

(51) Int. Cl.
*F23R 3/04* (2006.01)
*F02C 7/22* (2006.01)
*F23R 3/00* (2006.01)
(Continued)

(52) U.S. Cl.
CPC . *F02C 7/22* (2013.01); *F23R 3/007* (2013.01); *F23R 3/045* (2013.01); *F23R 3/06* (2013.01); *F23R 3/60* (2013.01)

(58) Field of Classification Search
CPC .............. F02C 7/22; F23R 3/002; F23R 3/04; F23R 3/045; F23R 3/06; F23R 3/60; F23M 5/00; F23M 5/085; F23G 2203/30; F23G 2203/207; F23C 7/00; F23C 2203/30; F23C 2700/063; F23C 2900/06041; F23L 19/04
USPC ............ 60/752, 754, 759, 760, 755; 431/351, 431/352, 165, 164, 162, 10, 4
See application file for complete search history.

(56) References Cited

U.S. PATENT DOCUMENTS 3,594,109 A * 7/1971 Penny .................... F01D 25/005
60/753
3,899,882 A   8/1975 Parker
(Continued)

FOREIGN PATENT DOCUMENTS

DE   69209020   11/1996
DE   10214574   10/2003
(Continued)

OTHER PUBLICATIONS

German Search Report dated Mar. 21, 2013 from counterpart application.

*Primary Examiner* — Steven Sutherland
(74) *Attorney, Agent, or Firm* — Timothy J. Klima; Shuttleworth & Ingersoll, PLC

(57) ABSTRACT

The present invention relates to a gas-turbine combustion chamber with mixing air orifices, with a combustion chamber wall, with tiles arranged on the inside of the combustion chamber wall at a certain distance from said combustion chamber wall as well as with mixing air orifices passing through the combustion chamber wall and the tiles, characterized in that the mixing air orifices are formed by chutes which are designed tube-like and pass through the tiles, and that several chutes are formed on a mixing air wall element extending at least around part of the circumference of the combustion chamber.

20 Claims, 14 Drawing Sheets

Figure 1:
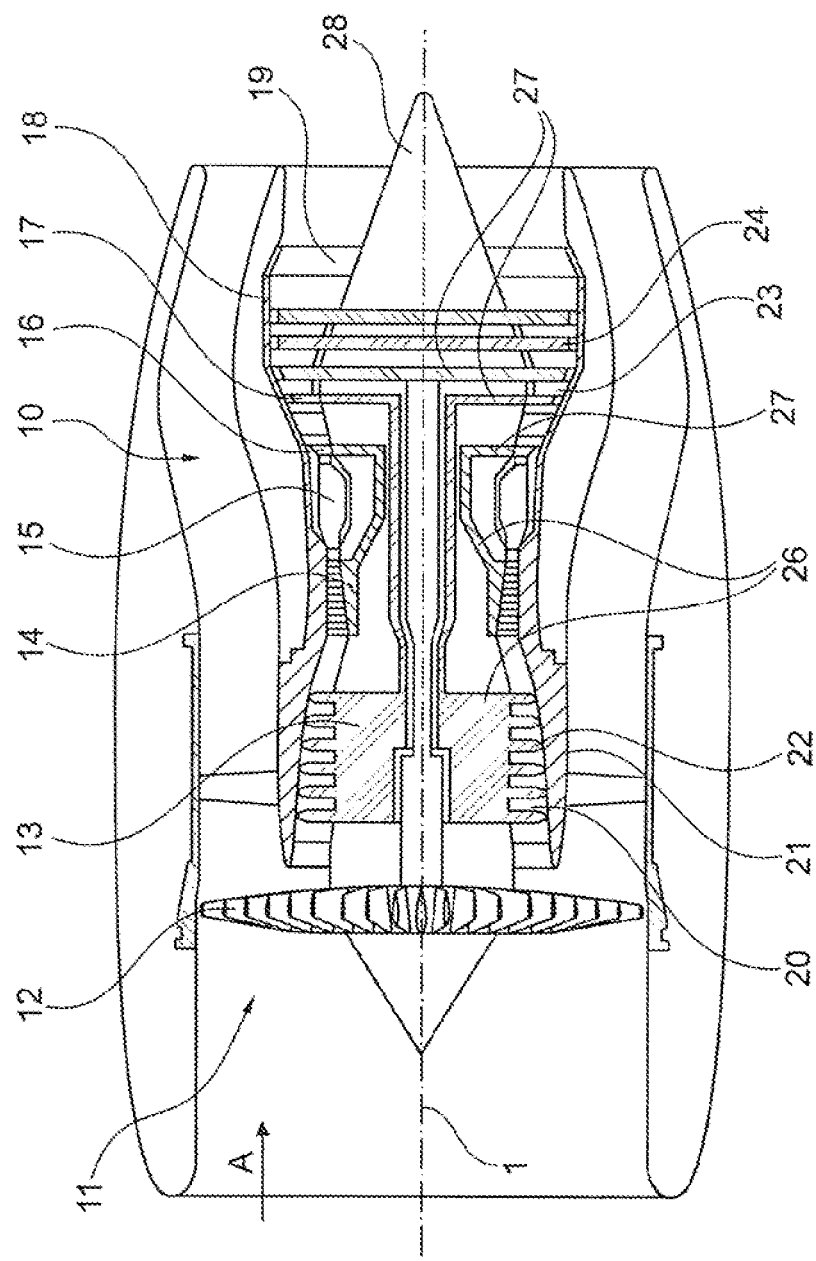

(51) Int. Cl.
*F23R 3/06* (2006.01)
*F23R 3/60* (2006.01)

(56) References Cited

U.S. PATENT DOCUMENTS 3,918,255 A * 11/1975 Holden ............... F23R 3/045
                                                                      431/352
4,104,874 A * 8/1978 Caruel ............... F23R 3/002
                                                                      431/351
4,244,178 A * 1/1981 Herman ............... F23R 3/002
                                                                       60/754
4,887,432 A    12/1989 Mumford et al.
5,351,474 A    10/1994 Slocum et al.
8,096,133 B2   1/2012 Hessler et al.
9,010,120 B2 * 4/2015 DiCintio ............... F23R 3/06
                                                                         60/746
2002/0116929 A1  8/2002 Snyder

FOREIGN PATENT DOCUMENTS

| | | |
|---|---|---|
| DE | 102006048842 | 4/2008 |
| DE | 102009025795 | 11/2009 |
| EP | 0564183 | 10/1993 |
| EP | 2180256 | 4/2010 |

* cited by examiner

State of the art

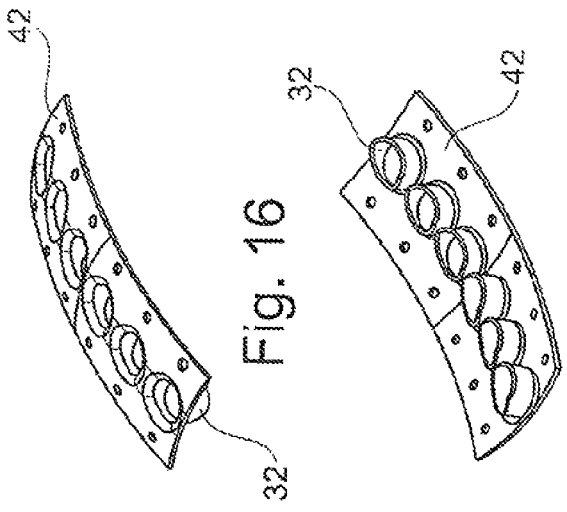
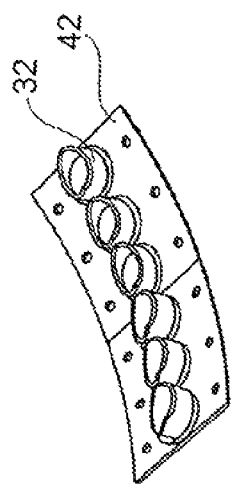
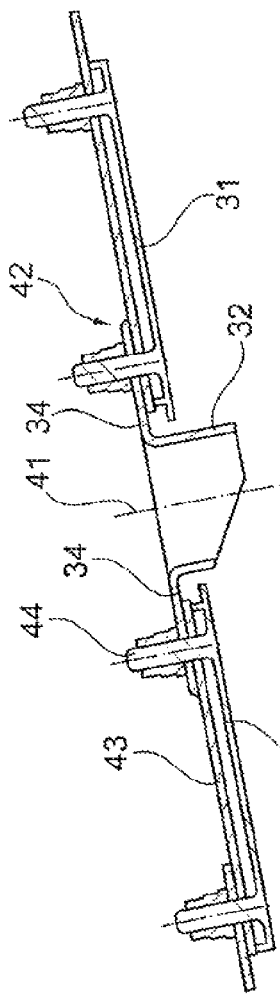
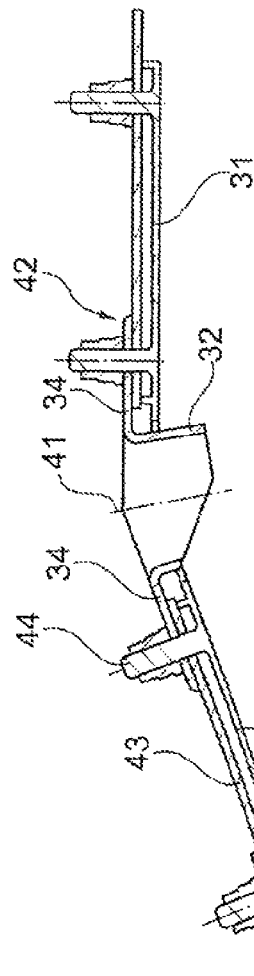
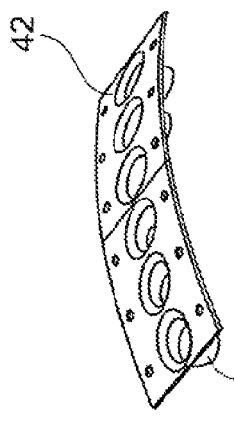

GAS-TURBINE COMBUSTION CHAMBER WITH MIXING AIR ORIFICES AND CHUTES IN MODULAR DESIGN

This application claims priority to German Patent Application No. DE102012015449.6 filed Aug. 3, 2012, which application is incorporated by reference herein.

This invention relates to a gas-turbine combustion chamber with mixing air orifices.

In detail, the invention relates to a gas-turbine combustion chamber wall in which mixing air orifices are provided. On the inside of the combustion chamber wall, which is provided on its inside with tiles, the mixing air orifices are designed such that mixing air can be introduced from the outside of the combustion chamber wall into the interior of the combustion chamber.

The state of the art shows chutes, which are fastened to the tiles or are designed in one piece with the tiles by means of a casting method, for better flow guidance of the air. These tiles are provided with chutes and fastened to a tile support which is used for mounting on the combustion chamber wall.

In the designs known from the state of the art it has proved disadvantageous that the connection of the chutes to the tile and their fitting on the respective tile support is not designed with favourable flow characteristics; instead, these designs result in sharp-edged and narrow radii which lead to flow separations. These result in turn in an increased pressure loss and in a reduced flow through the mixing orifices/mixing air orifices. With the designs known from the state of the art, it is not possible to optimize their flow.

A further disadvantage can result from the fact that in the area of the mixing air orifices/mixing orifices it is not possible to seal off the space between the combustion chamber wall and the tiles, so that part of the mixing air flows into the space between the combustion chamber wall and the tile, and additional disruptions of the entire flow guidance system, also with regard to cooling of the tiles, occur as a result.

A disadvantage of the combustion chambers known from the state of the art is that they are assembled from a large number of individual components and require a high manufacturing and assembly effort. Moreover, the flow conditions, in particular with regard to the flow guidance of the mixing air, cannot always be designed in an optimum way.

The object underlying the present invention is to provide a gas-turbine combustion chamber of the type specified at the beginning which, while being simply designed and easily and cost-effectively producible, enables an optimized structure, ease of assembly and a good mixing airflow guidance, while avoiding the disadvantages of the state of the art.

It is a particular object of the present invention to provide solution to the above problematics by a combination of the features described herein. Further advantageous embodiments of the present invention become apparent from the present descriptions.

In accordance with the invention, therefore, it is in particular provided that several chutes are formed on a mixing air wall element extending at least around a part of the circumference of the combustion chamber. The several chutes can thus be manufactured in one piece with the mixing air wall element. The invention permits design of an annular structure for the entire combustion chamber, where the individual mixing air wall elements, which are provided on both the combustion chamber outer wall and the combustion chamber inner wall, extend over part of the circumference of the combustion chamber and hence form circular segments. This also simplifies the design of the combustion chamber. This results in advantages particularly with regard to the overall stability of the combustion chamber.

The mixing air wall elements with the chutes can be manufactured for example as castings or in a welded design.

It is particularly favourable when the several chutes are arranged in a single row on the mixing air wall elements and thus extend in the circumferential direction. By the embodiment in accordance with the invention, it is possible to provide a plurality of closely adjacent chutes. As a result, a larger number of chutes can be provided for supplying a larger air quantity and/or the individual chutes, which can form a row of holes, can each be designed with a smaller diameter, since a larger number of these chutes can be provided when compared with the state of the art. This results in an improved flow coefficient, so that the overall design of the mixing air supply can be optimized.

In accordance with the invention, the several chutes can be arranged perpendicularly to the combustion chamber wall or at an angle thereto. This too results in an improvement of the mixing air supply to the combustion chamber.

A further advantage of the embodiment in accordance with the invention, in which the chutes are designed in one piece with the respective mixing air wall element, is that the occurrence of a leakage flow in the area of the chutes can be prevented or at least considerably reduced. If a leakage flow does occur, it would do so at a transition area between a mixing air wall element and a tile support wall element supporting the tiles, where a leakage flow is less critical and not so important for the flow behaviour as a whole.

As already mentioned, the mixing air wall elements provided with chutes can be manufactured by means of a casting method or a joining method (welding). It is however also possible to produce them by means of a shaping method. An optimized component strength which requires a low manufacturing effort can thus be achieved.

The design in accordance with the invention results in the possibility of assembling the entire combustion chamber from ring segments, where a combustion chamber head can be bolted in simple manner to the adjacent ring segment-like tile support wall elements on the inflow side. The mixing air zone is thus provided integrally in accordance with the invention.

In accordance with the invention, it is thus provided that the mixing air orifices are formed by chutes which are designed tube-like, are fastened to the combustion chamber wall and pass through the tiles.

In accordance with the invention, a possibility is thus created of providing the chutes directly on the mixing air wall elements. As a result of this design solution, it is possible to obtain larger curvature radii at the inlet area of the mixing orifices and the chutes, respectively. This possibility does not exist in designs known from the state of the art.

A further substantial advantage of the solution in accordance with the invention is that the chutes are designed tube-like, for example by means of a casting method, a shaping method or a joining method. Hence the manufacture and fitting of the chutes is independent of the combustion chamber wall and the tiles. It is also possible to make the chutes out of suitable materials which can differ from the materials of the combustion chamber wall and of the tiles.

In accordance with the invention, it is particularly favourable when the chutes are provided with a flow-optimized inflow area. With a substantially tube-like chute, it is possible to design the inflow area annularly, for example funnel-shaped or with a rounded cross-section. The inflow area can also be designed asymmetrical relative to a center axis of the chute, making possible a flow-optimized mixing air inlet into the chutes.

In a particularly favourable embodiment, it is thus provided that the chute is given a flange or a rim, i.e. the mixing air wall element, which is in sealing contact with the combustion chamber wall and/or the tile. This creates the possibility of fitting the chutes in optimum manner on the combustion chamber and of ensuring maximum strength of the combustion chamber wall in particular in the area of the chutes.

It is thus possible in accordance with the invention to combine several chutes in an annular or partially annular arrangement and to design them as a common structural element (mixing air wall element) which is subsequently connected to the combustion chamber wall by means of a joining method.

With the embodiment as provided in accordance with the invention of the chutes and their structural fastening to the combustion chamber wall or the tile support, respectively, it is thus possible to optimize the routing of the mixing air at the inlet area of the chutes, in particular by larger curvature radii of the inflow area of the individual chutes. Flow separation can thus be reduced or prevented in accordance with the invention. This in turn leads to the advantage that pressure losses during supply of the mixing air are reduced. This results in an effective exploitation during the flow through the mixing air orifices. With this optimization, it is in turn possible in accordance with the invention to provide smaller diameters of the mixing air orifices and/or to achieve an increased pulse of the mixing air supplied for the mixing process inside the combustion chamber. This in turn leads to improved flow conditions and combustion conditions in the combustion chamber, so that pollutants can be reduced. It is furthermore possible to reduce the overall pressure loss in the combustion chamber and/or to improve the temperature profile at the combustion chamber outlet.

Figure 2:
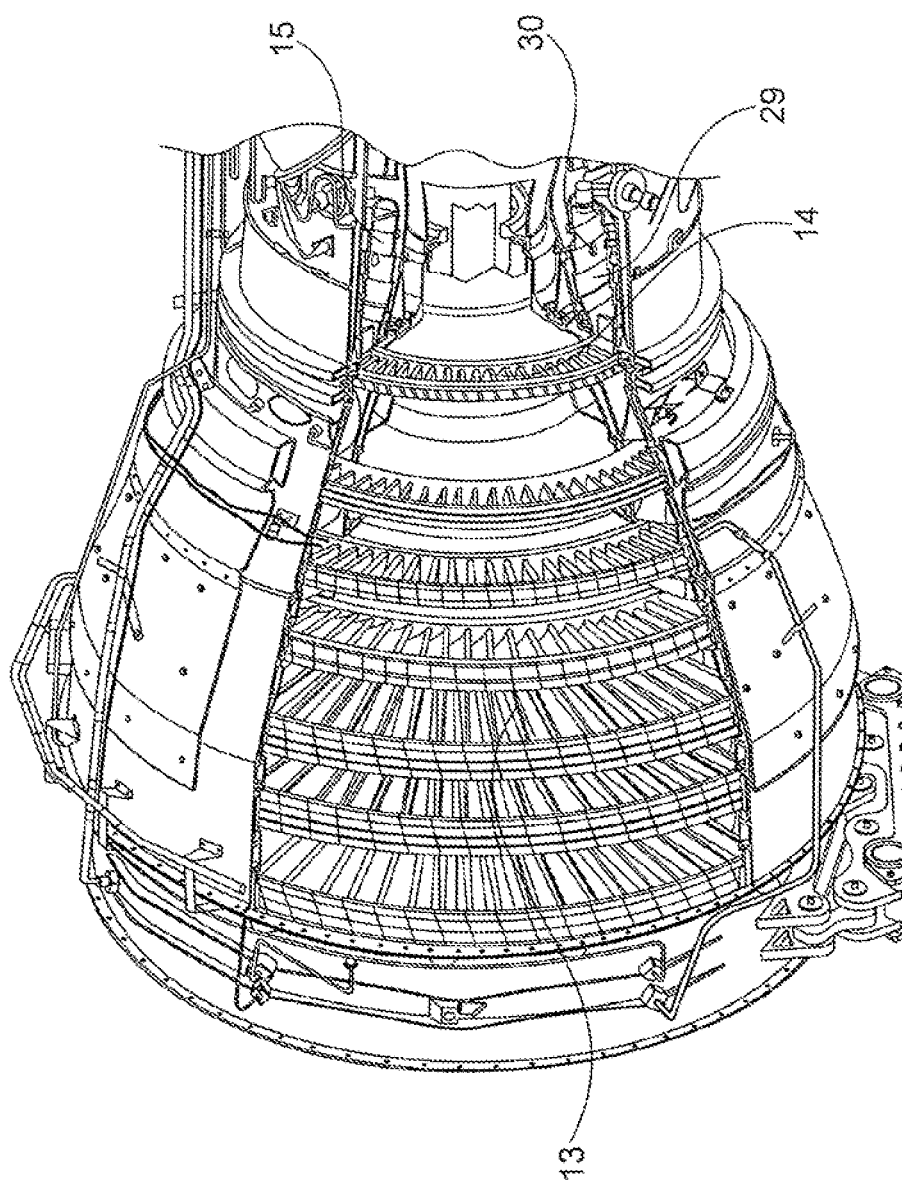
Figure 3:
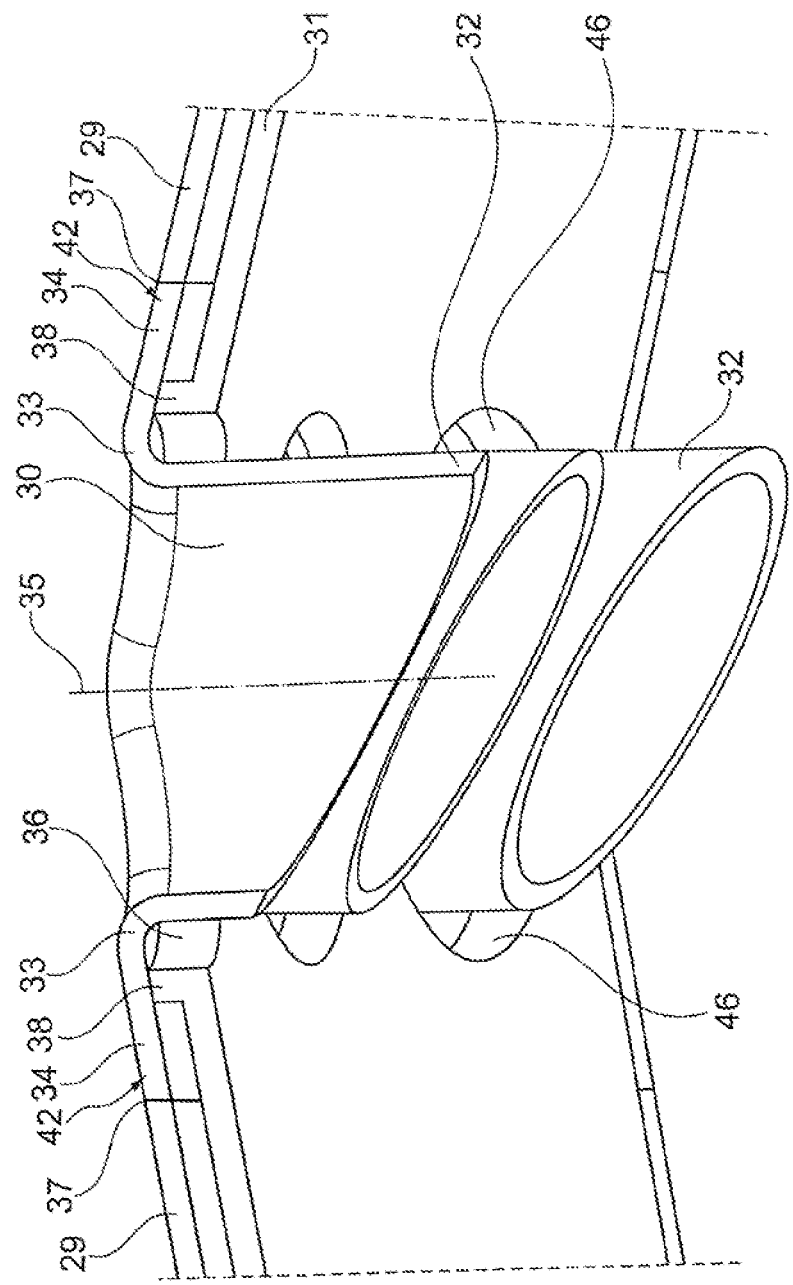
Figure 4:
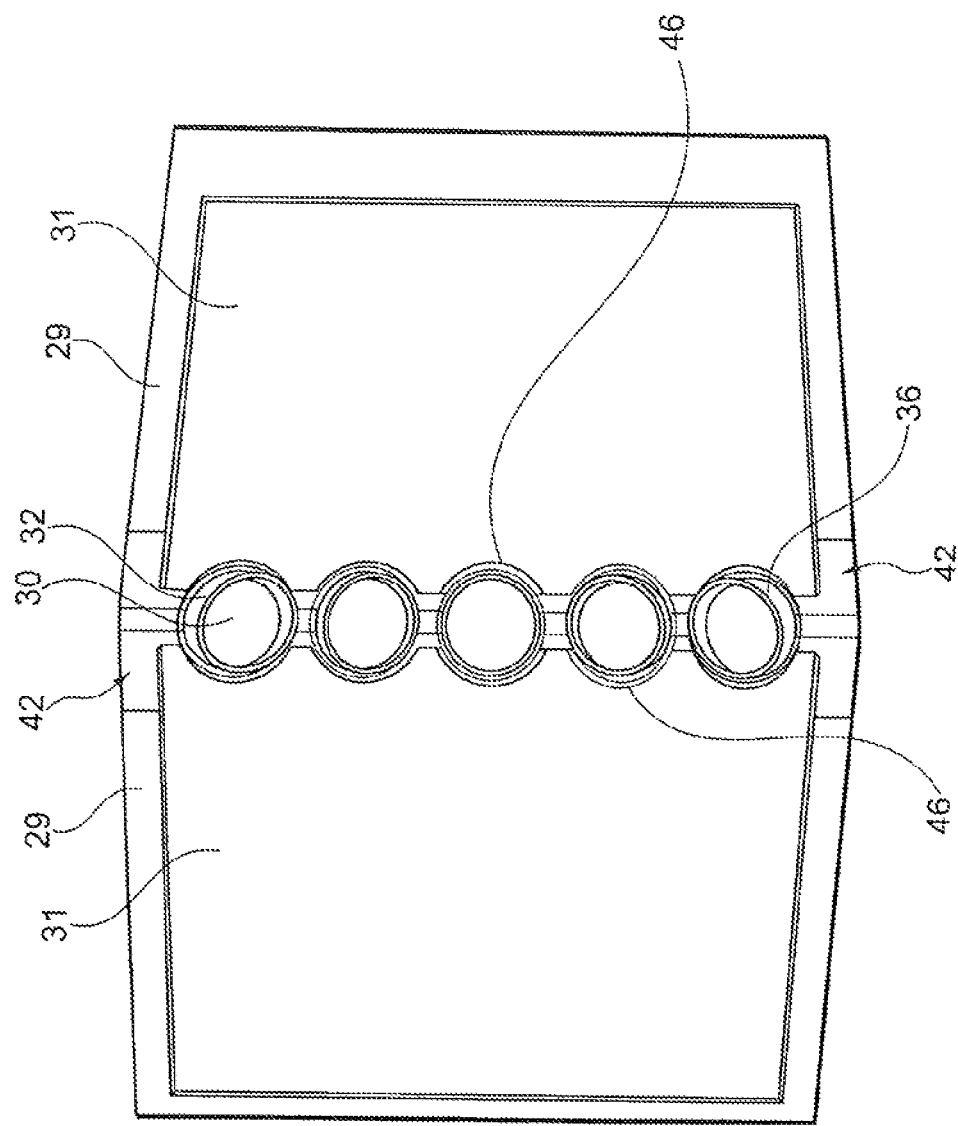
Figure 5:
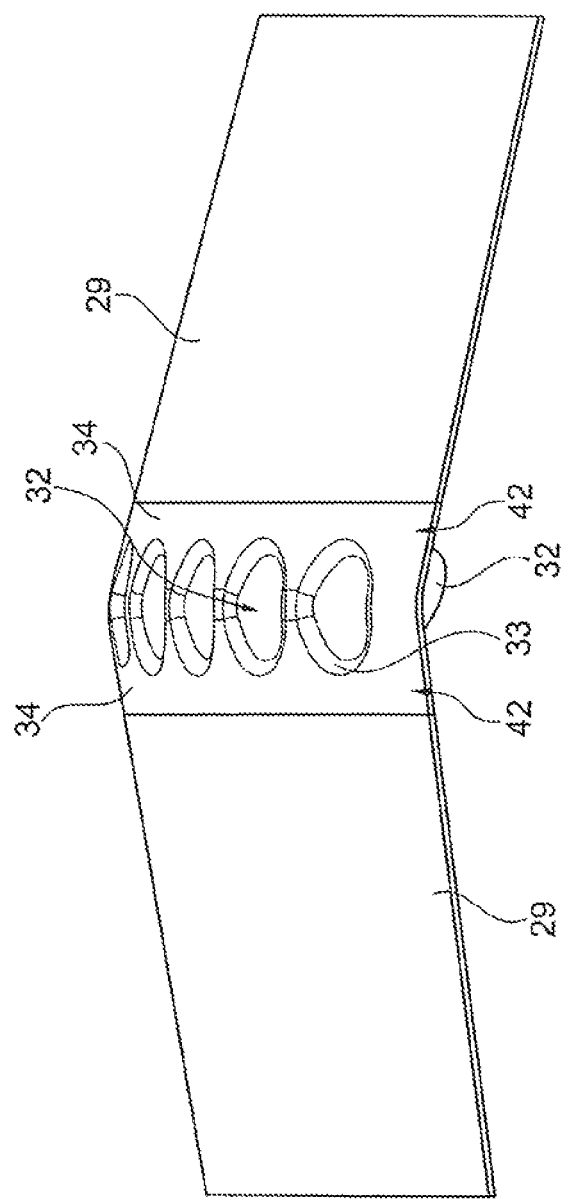
Figure 6:
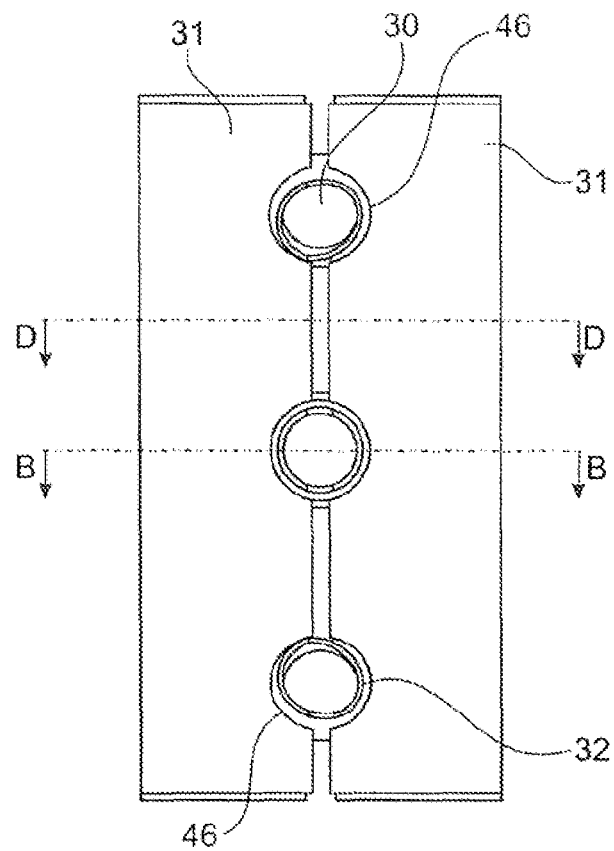
Figure 7:
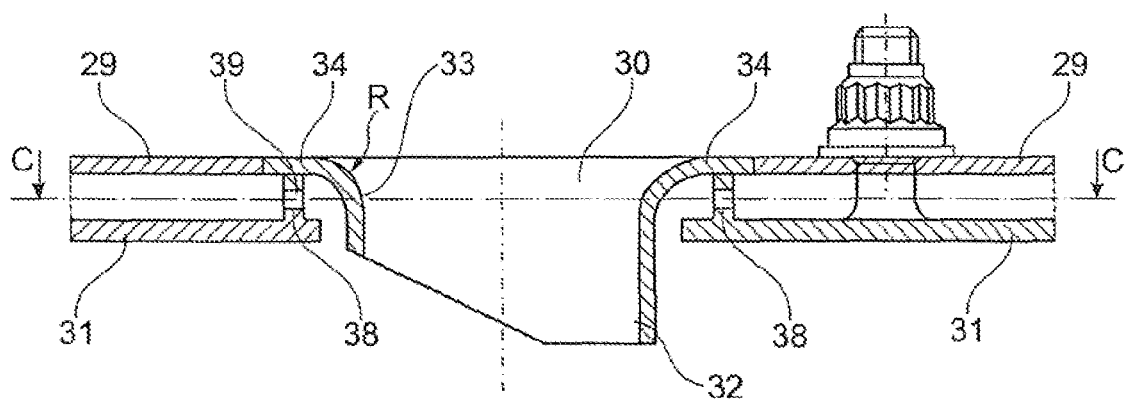
Figure 8:
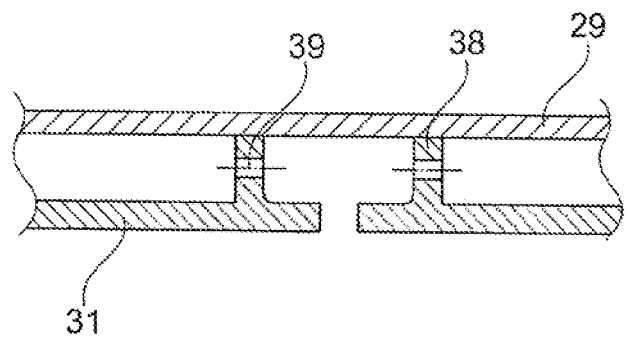
Figure 9:
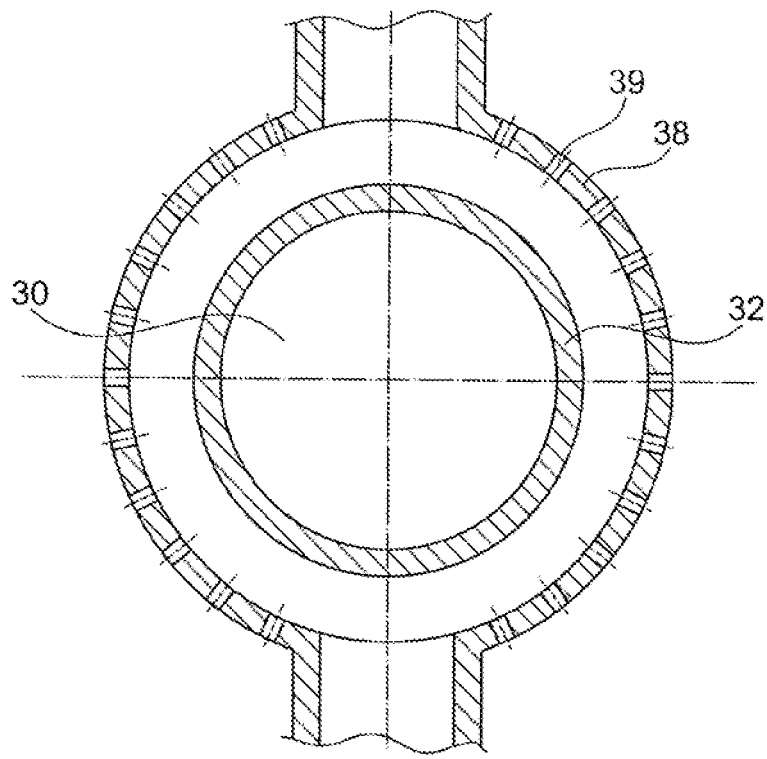
Figure 10:
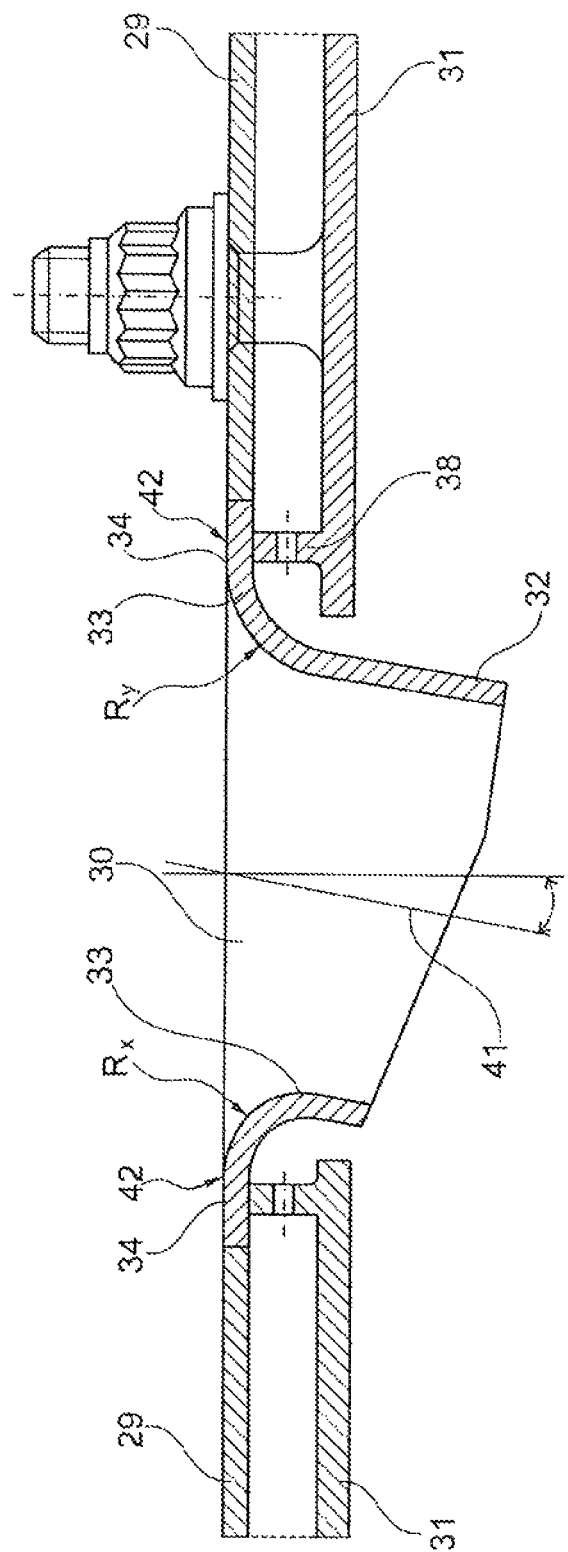
Figure 11:
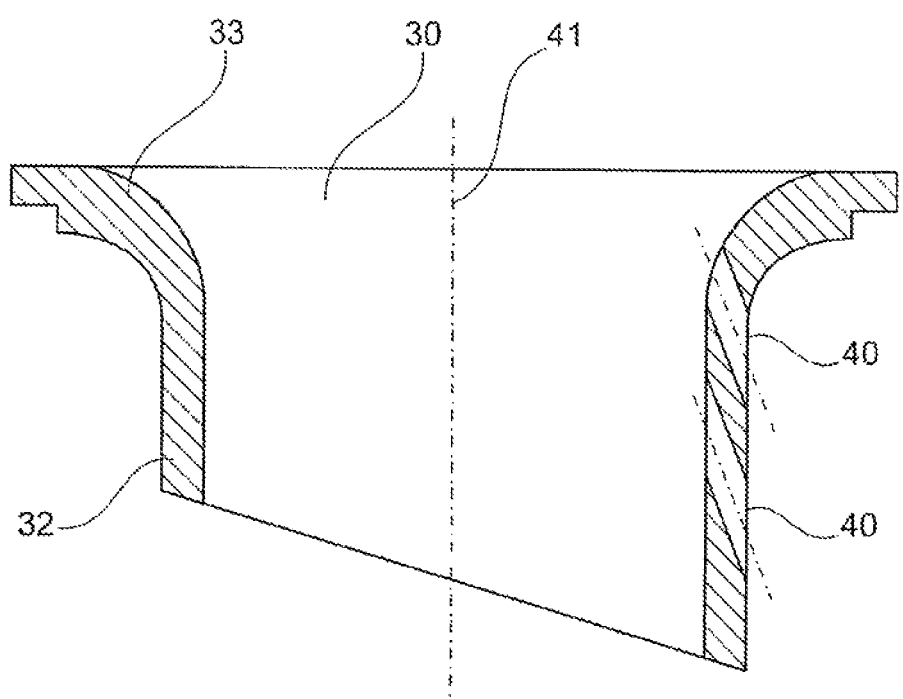
Figure 12:
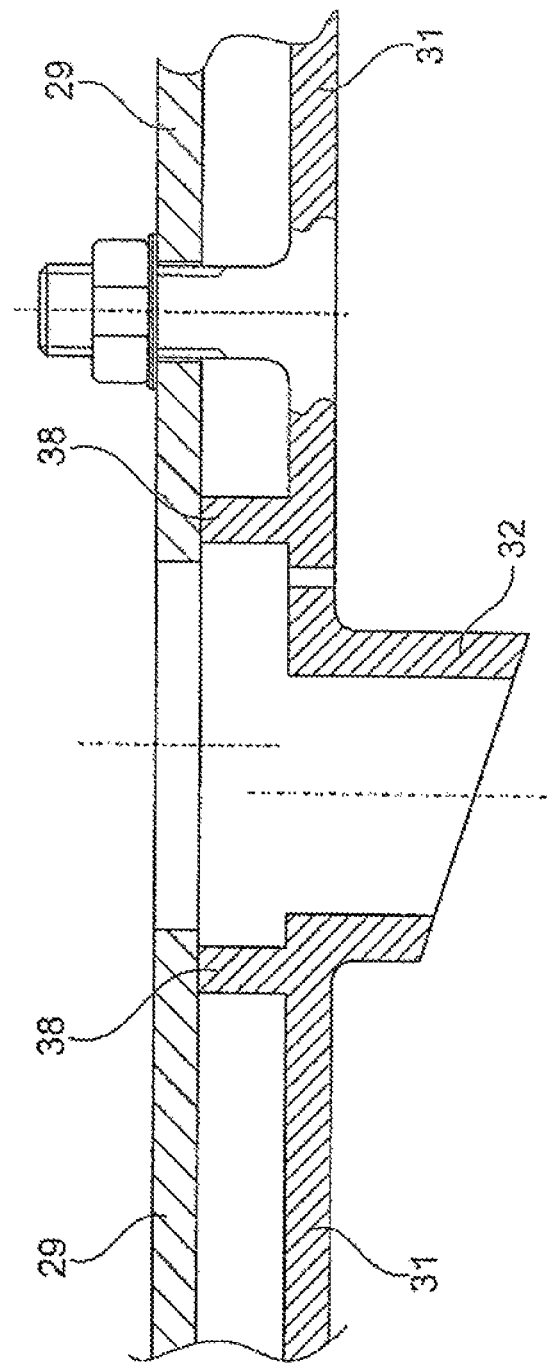
Figure 21:
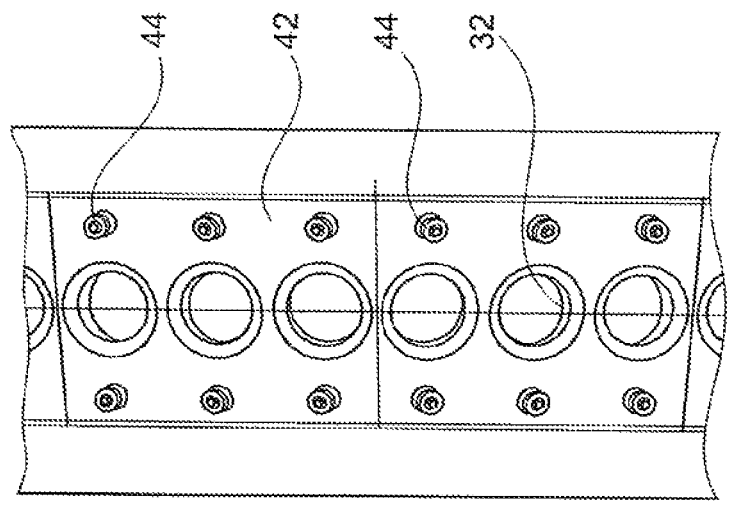
Figure 22:
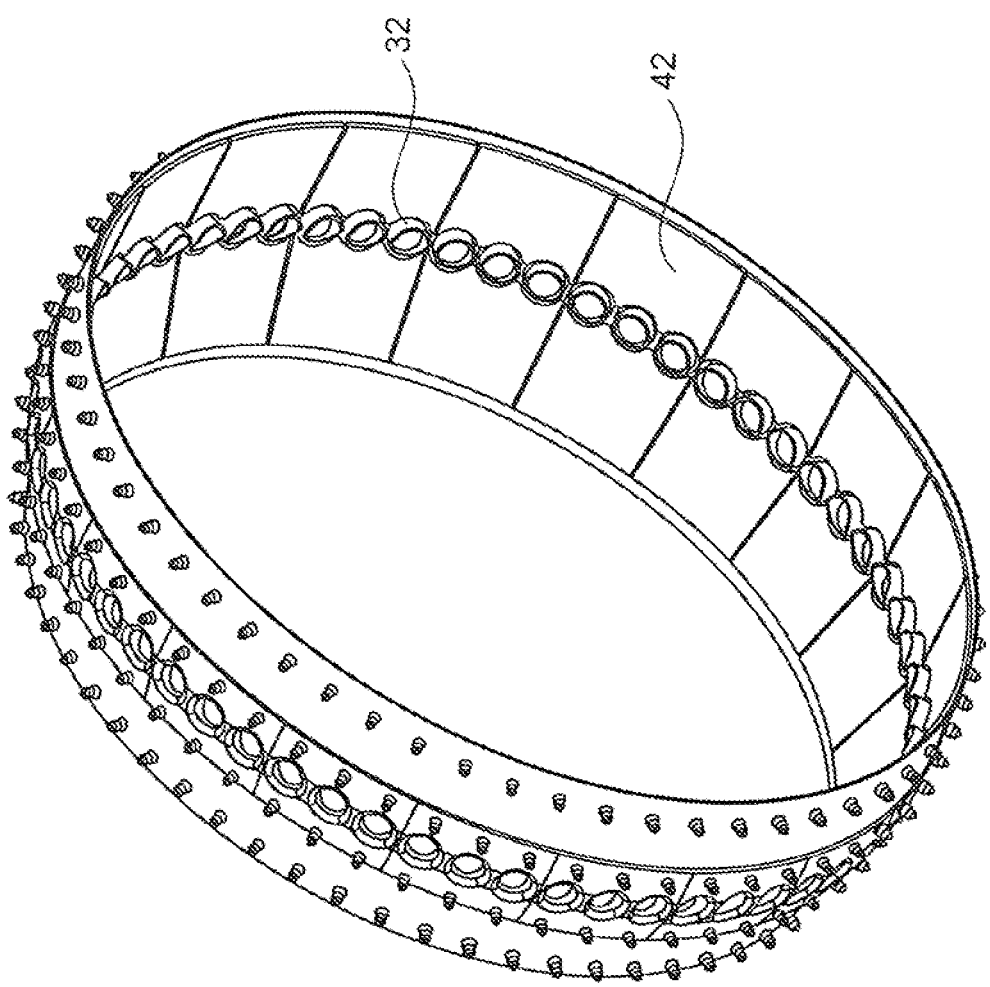

The present invention is described in the following in light of the accompanying drawing, showing exemplary embodiments. In the drawing, FIG. 1 shows a schematic representation of a gas-turbine engine in accordance with the present invention, FIG. 2 shows a perspective partial view of a further variant of a gas-turbine engine in accordance with the present invention, FIG. 3 shows an enlarged sectional view of a partial area of the combustion chamber wall with chutes, FIG. 4 shows a top view in the radial direction onto the inside of the combustion chamber in accordance with the present invention, FIG. 5 shows a top view, by analogy with FIG. 4, onto the outside of the combustion chamber, FIG. 6 shows a view, in the radial direction, onto the inside of the combustion chamber in accordance with the present invention, by analogy with FIG. 4, FIG. 7 shows a sectional view along line B-B of FIG. 6, FIG. 8 shows a sectional view along line D-D of FIG. 6, FIG. 9 shows a sectional view along line C-C of FIG. 7, FIG. 10 shows a view, similar to FIG. 7, where the center axis of the chute is inclined, FIG. 11 shows a schematic representation of the chute in a further exemplary embodiment, with additional effusion hole, FIG. 12 shows a sectional view, by analogy with FIG. 7, of the embodiment in accordance with the state of the art, FIG. 13 shows a perspective partial view of a first exemplary embodiment of a mixing air wall element with chute in accordance with the present invention, FIG. 14 shows a view, by analogy with FIG. 13, of the bottom side shown in FIG. 13, FIG. 15 shows a sectional view of the mixing air wall elements with tile support wall elements shown in FIGS. 13 and 14, FIGS. 16-18 show views of a further exemplary embodiment by analogy with FIGS. 13 to 15, FIG. 19 shows an enlarged representation of the combustion chamber in accordance with the present invention, as per the exemplary embodiment shown in FIGS. 13 to 15 with combustion chamber head, FIGS. 20-21 show an outer view and an inner view of the mixing air wall elements in accordance with the present invention in the assembled state, and FIG. 22 shows a perspective view of a combustion chamber module.

The gas-turbine engine 10 in accordance with FIG. 1 is a generally represented example of a turbomachine where the invention can be used. The engine 10 is of conventional design and includes in the flow direction, one behind the other, an air inlet 11, a fan 12 rotating inside a casing, an intermediate-pressure compressor 13, a high-pressure compressor 14, combustion chambers 15, a high-pressure turbine 16, an intermediate-pressure turbine 17 and a low-pressure turbine 18 as well as an exhaust nozzle 19, all of which being arranged about a center engine axis 1.

The intermediate-pressure compressor 13 and the high-pressure compressor 14 each include several stages, of which each has an arrangement extending in the circumferential direction of fixed and stationary guide vanes 20, generally referred to as stator vanes and projecting radially inwards from the engine casing 21 in an annular flow duct through the compressors 13, 14. The compressors furthermore have an arrangement of compressor rotor blades 22 which project radially outwards from a rotatable drum or disk 26 linked to hubs 27 of the high-pressure turbine 16 or the intermediate-pressure turbine 17, respectively.

The turbine sections 16, 17, 18 have similar stages, including an arrangement of fixed stator vanes 23 projecting radially inwards from the casing 21 into the annular flow duct through the turbines 16, 17, 18, and a subsequent arrangement of turbine blades 24 projecting outwards from a rotatable hub 27. The compressor drum or compressor disk 26 and the blades 22 arranged thereon, as well as the turbine rotor hub 27 and the turbine rotor blades 24 arranged thereon rotate about the engine axis 1 during operation.

FIG. 2 shows a perspective partial sectional view of a gas-turbine engine in accordance with the present invention. This view illustrates in particular the position of the combustion chamber 15. FIG. 2 furthermore shows a combustion chamber wall 29 with mixing air orifices 30, through which mixing air is passed into the combustion chamber interior.

FIG. 3 shows an enlarged partial sectional view of an exemplary embodiment of a chute 32 in accordance with the invention. This chute is designed tube-like and has a flange 34 which can be designed annular or rectangular. In the exemplary embodiment shown in FIGS. 4 and 5, the flange 34 is designed in the form of a flat strip and angled relative to a plane formed by the center axis 35, as can be seen in particular from FIG. 5. The flange/web 34 is a part of a mixing air wall element 42 as described in the following.

FIG. 3 in particular shows clearly that the chute 32 is provided at its inflow area 33 with a rounded and flow-optimized cross-section. In accordance with the invention, a tile orifice 36, which is preferably designed circular, has a diameter greater than that of the chute 32. This provides a sufficient clearance to permit a flow-favouring rounding off or other design of the inflow area 33.

FIG. 3 shows that the respective flange 34, which is part of the mixing air wall element 42, is butt-joined to a rim area of the respective combustion chamber wall 29 (tile support). This joining area 37 is thus flow-optimized and does not present any flow resistance.

Furthermore, FIG. 3 shows that a respective the 31 has a flange 38 which is in sealing contact with the mixing air wall element 42 or the flange 34 of the chute 32. This prevents both unwelcome airflows from entering the area between the tile 31 and the combustion chamber wall 29, and the air volumes introduced into it for cooling purposes from exiting in an unwelcome manner in the area of the chute 32.

The mixing air wall element 42 thus includes the chutes 32, the flange 34 and the inflow area 33.

FIG. 4 shows a view from the inside of the combustion chamber, hence a view onto the hot side of the combustion chamber wall. The illustration in FIG. 4 makes clear the arrangement and design of the respective chutes 32 and of the mixing air wall element 42, It can be seen here that the adjacent tiles 31 are each provided with semi-circular recesses 36 in order to enclose the several chutes 32 fastened to a common mixing air wall element 42.

FIG. 5 shows a view, by analogy with FIGS. 3 and 4, from the outside of the combustion chamber, hence from the cold side. This again makes clear in particular that the two flanges 34 form an angle to one another, so that it is possible to provide a suitable combustion chamber structure with angled tiles 29.

FIG. 6 shows a view, by analogy with FIG. 4. This allows dimensioning and assignment of the tiles 31 to the mixing air orifices 30 or to the chutes 32 in a suitable manner. As a result, both the arrangement and the dimensioning of the chutes 32 can be adapted to the respective spatial situation.

FIG. 7 shows a sectional view along line B-B according to FIG. 6, where in particular it is discernible that the inflow area 33 is rounded and can be provided with a relatively large radius. Since there is the possibility in accordance with the invention of providing a large flange 34 of the mixing air wall element 42, effective sealing off from the flange 38 of the tile 31 is possible.

FIG. 8 shows a sectional view along line D-D of FIG. 6. For greater clarity, recesses 39 in the flange or web 38 of the tile 31 are shown, through which cooling air can enter/exit the space between the tile 31 and the combustion chamber wall 29.

The sectional view represented in FIG. 9 shows the spatial assignment of the chute 32 to the flange 38. The result of this is that the embodiment in accordance with the invention is particularly advantageous with regard to the thermal expansions and contractions, since a stress-free overall structure is made possible.

FIG. 10 shows an illustration, by analogy with FIG. 7, which makes clear that it is also possible in accordance with the invention to arrange the chute 32 at an angle relative to its center axis, so that different radii are obtained at the inflow areas 33 (radii Rx and Ry). Different radii about the circumference may therefore be present. These radii can also apply when the center axis 41 is not arranged obliquely relative to the tangential plane of the combustion chamber tiles 31.

FIG. 11 shows a further variant of the chute 32 in accordance with, the invention, in which additional effusion recesses 40 are provided and serve to cool the combustion chamber tiles 31.

FIG. 12 shows, in comparison with the illustration of FIG. 7, an embodiment according to the state of the art. It can be seen here, in particular that the inflow area of the chutes 32 is more unfavourable and difficult to optimize in terms of its flow conditions than in the solution in accordance with the invention.

FIGS. 13 to 15 show an exemplary embodiment in which a circular segment-like mixing air wall element 42 is designed such that the center axis 41 of the chute 32 extends at a right angle to the respective sectional plane (see FIG. 15). Overall, the mixing air wall elements 42 are designed in the form of ring segments, so that when arranged next to one another and appropriately mounted they form an outer combustion chamber wall and an inner combustion chamber wall, respectively, in the form of an annular element. The exemplary embodiment of FIGS. 13 to 15 shows a variant in which the two flange areas 34 are arranged in a plane relative to one another. In the exemplary embodiment in FIGS. 16 to 18, the flange areas 34 are at an angle to one another in respect of their center planes so that a kinked or angled partial area of a combustion chamber wall can be provided.

FIGS. 13 to 18 furthermore show that the mixing air wall elements 42 are each provided with recesses through which bolts 44 can be passed in order to bolt the mixing air wall elements 42 to adjacent tile support wall elements 43. An arrangement bolted in this way is shown in FIGS. 20 and 21, where it can be seen here that the respective tiles 31 are provided with partially round recesses 46 of their rim area to permit as tight a contact as possible to the chutes 32.

Figure 19:
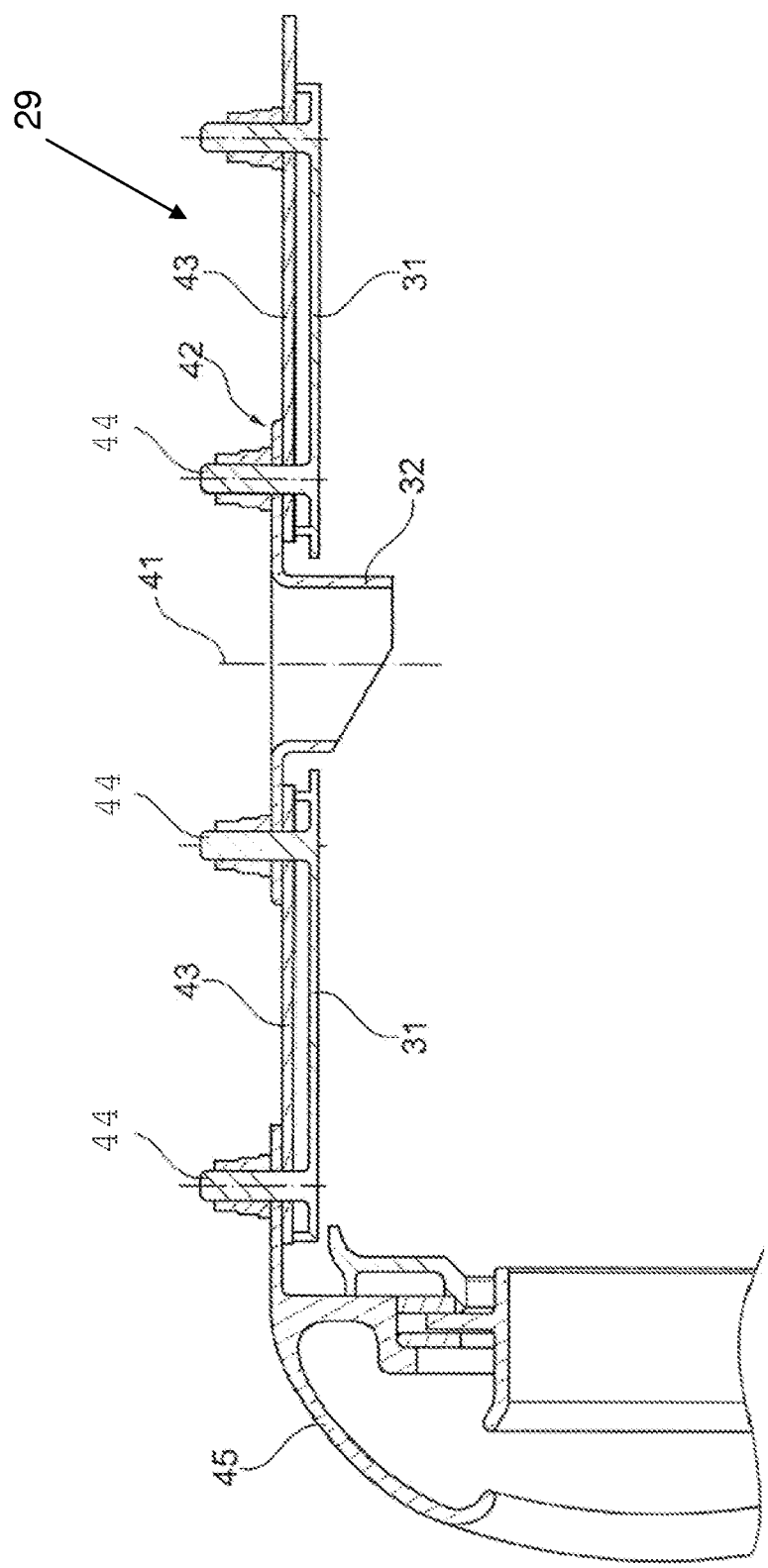
Figure 20:
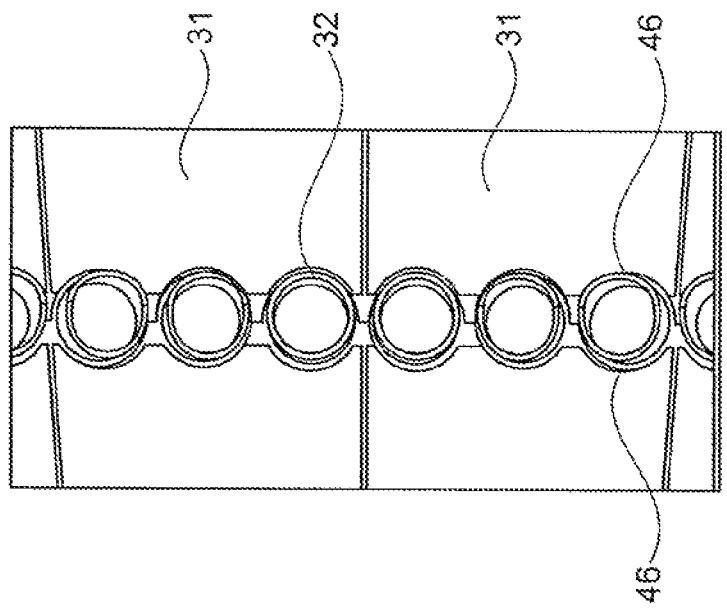

FIG. 19 shows an enlarged partial view of an axial section through a combustion chamber by analogy with the exemplary embodiment of FIGS. 13 to 15 with a fitted combustion chamber head 45, which in accordance with the invention is likewise connected in simple manner to the adjacent tile support wall element 43 by means of bolts 44.

The result is that the individual mixing air wall elements and the individual tile support wall segments are each designed as circular ring segments from which the entire combustion chamber wall with the associated tiles is assembled.

FIG. 22 shows a perspective view of a combustion chamber module, which is designed annularly and includes the mixing air wall elements 42 in accordance with the present invention.

LIST OF REFERENCE NUMERALS

1 Engine axis
10 Gas-turbine engine/core engine
11 Air inlet
12 Fan rotating inside the casing
13 Intermediate-pressure compressor
14 High-pressure compressor
15 Combustion chamber
16 High-pressure turbine
17 Intermediate-pressure turbine
18 Low-pressure turbine
19 Exhaust nozzle
20 Guide vanes
21 Engine casing
22 Compressor rotor blades
23 Stator vanes
24 Turbine blades
26 Compressor drum or disk
27 Turbine rotor hub
28 Exhaust cone
29 Combustion chamber wall
30 Mixing air orifice 31 Tile
32 Chute
33 Inflow area
34 Flange/web
35 Center axis
36 Tile orifice
37 Joining area
38 Flange/web of tile
39 Recess
40 Effusion recess
41 Center axis
42 Mixing air wall element
43 Tile support wall element/tile support wall segment
44 Bolt
45 Combustion chamber head
46 Recess

What is claimed is:

1. A gas-turbine combustion chamber comprising:
a combustion chamber wall,
tiles arranged on an interior of the combustion chamber wall, at least portions of the tiles being spaced apart from the combustion chamber wall;
mixing air orifices passing through the combustion chamber wall and the tiles,
a mixing air wall element extending at least around a portion of a circumference of the combustion chamber and including a plurality of the mixing air orifices;
wherein, each of the plurality of mixing air orifices includes a tubular chute passing from an exterior of the combustion chamber wall through at least one tile to an interior of the combustion chamber, the tubular chute including an inflow area;
a flange transitioning to the tubular chute in the inflow area of the tubular chute, the flange level with a surrounding adjacent portion of the combustion chamber wall and smoothly transitioning between the surrounding adjacent portion of the combustion chamber wall and the inflow area;
wherein the mixing air wall element is shaped as a circular segment.

2. The gas-turbine combustion chamber in accordance with claim 1, wherein the combustion chamber wall includes tile support wall elements supporting the tiles, wherein the mixing air wall element is connected to tile support wall elements positioned on opposite sides of the mixing air wall element.

3. The gas-turbine combustion chamber in accordance with claim 2, and further comprising threaded fasteners connecting the mixing air wall element to the tile support wall elements.

4. The gas-turbine combustion chamber in accordance with claim 2, wherein the mixing air wall element is welded to the tile support wall elements.

5. The gas-turbine combustion chamber in accordance with claim 1, wherein the mixing air wall element is a casting.

6. The gas-turbine combustion chamber in accordance with claim 1, wherein the tubular chutes of the plurality of mixing air orifices are arranged in a single row in a circumferential direction of the combustion chamber.

7. The gas-turbine combustion chamber in accordance with claim 1, wherein the combustion chamber wall includes tile support wall elements supporting the tiles, with at least portions of the tiles being spaced apart from the tile support wall elements.

8. The gas-turbine combustion chamber in accordance with claim 7, and further comprising a combustion chamber head and a plurality of the mixing air wall elements and the tile support wall elements, each formed as at least one chosen from a ring and a ring segment, each extending in a circumferential direction of the combustion chamber, the at least one chosen from the rings and ring segments being adjacently arranged in an axial direction of the combustion chamber and connected to the combustion chamber head.

9. The gas-turbine combustion chamber of claim 8, wherein the mixing air wall elements attach tile support wall elements upstream of the mixing air wall elements to tile support wall elements downstream of the mixing air wall elements.

10. The gas-turbine combustion chamber of claim 9, wherein the inflow area includes a radiused portion and the radiused portion extends through the combustion chamber wall toward an interior of the combustion chamber to a position beyond a combustion chamber side of the combustion chamber wall.

11. The gas-turbine combustion chamber in accordance with claim 1, wherein each of the tubular chutes of the plurality of mixing air orifices includes a rounded inflow area.

12. The gas-turbine combustion chamber of claim 1, wherein the circular segment attaches a portion of the combustion chamber wall upstream of the circular segment to a portion of the combustion chamber wall downstream of the circular segment.

13. The gas-turbine combustion chamber of claim 12, wherein the inflow area includes a radiused portion and the radiused portion extends through the combustion chamber wall toward an interior of the combustion chamber to a position beyond a combustion chamber side of the combustion chamber wall.

14. The gas-turbine combustion chamber of claim 1, wherein the inflow area includes a radiused portion and the radiused portion extends through the combustion chamber wall toward an interior of the combustion chamber to a position beyond a combustion chamber side of the combustion chamber wall.

15. The gas-turbine combustion chamber of claim 14, wherein a radius of the radiused portion is greater than a thickness of the combustion chamber wall.

16. The gas-turbine combustion chamber of claim 1, wherein the flange is connected to the tubular chute.

17. The gas-turbine combustion chamber of claim 1, wherein the flange is integral with the tubular chute.

18. A gas-turbine combustion chamber comprising:
a combustion chamber wall,
tiles arranged on an interior of the combustion chamber wall at a certain distance from the combustion chamber wall;
mixing air orifices passing through the combustion chamber wall and the tiles,
a mixing air wall element extending at least around a portion of a circumference of the combustion chamber and including a plurality of the mixing air orifices;
wherein, each of the plurality of mixing air orifices includes a tubular chute passing from an exterior of the combustion chamber wall through at least one tile to an interior of the combustion chamber, the tubular chute including an inflow area;
wherein the inflow area includes a radiused portion and the radiused portion extends through the combustion chamber wall toward an interior of the combustion chamber to a position beyond a combustion chamber side of the combustion chamber wall;
wherein the mixing air wall element is shaped as a circular segment.

19. The gas-turbine combustion chamber of claim 18, wherein a radius of the radiused portion is greater than a thickness of the combustion chamber wall.

20. A gas-turbine combustion chamber comprising:
a combustion chamber wall,
tiles arranged on an interior of the combustion chamber wall, at least portions of the tiles being spaced apart from the combustion chamber wall;
mixing air orifices passing through the combustion chamber wall and the tiles,
a mixing air wall element extending at least around a portion of a circumference of the combustion chamber and including a plurality of the mixing air orifices;
wherein, each of the plurality of mixing air orifices includes a tubular chute passing from an exterior of the combustion chamber wall through at least one tile to an interior of the combustion chamber, the tubular chute including an inflow area;
a flange transitioning to the tubular chute in the inflow area of the tubular chute, the flange level with a surrounding adjacent portion of the combustion chamber wall and smoothly transitioning between the surrounding adjacent portion of the combustion chamber wall and the inflow area;
wherein the combustion chamber wall includes tile support wall elements supporting the tiles, wherein the mixing air wall element is connected to tile support wall elements positioned on opposite sides of the mixing air wall element.

* * * * *